(12) United States Patent
Li et al.

(10) Patent No.: US 10,712,758 B2
(45) Date of Patent: Jul. 14, 2020

(54) REFRIGERATOR AND TEMPERATURE MEASUREMENT ERROR CORRECTING METHOD OF INFRARED SENSOR

(71) Applicant: QINGDAO HAIER JOINT STOCK CO., LTD., Qingdao, Shandong Province (CN)

(72) Inventors: Chunyang Li, Qingdao (CN); Sizhi Guo, Qingdao (CN); Ming Wang, Qingdao (CN)

(73) Assignee: QINGDAO HAIER JOINT STOCK CO., LTD., Qingdao, Shandong Province (CN)

( * ) Notice: Subject to any disclaimer, the term of this patent is extended or adjusted under 35 U.S.C. 154(b) by 121 days.

(21) Appl. No.: 15/737,757

(22) PCT Filed: Jun. 17, 2016

(86) PCT No.: PCT/CN2016/086191
§ 371 (c)(1),
(2) Date: Dec. 19, 2017

(87) PCT Pub. No.: WO2016/206571
PCT Pub. Date: Dec. 29, 2016

(65) Prior Publication Data
US 2018/0173254 A1    Jun. 21, 2018

(30) Foreign Application Priority Data

Jun. 26, 2015    (CN) .......................... 2015 1 0367211

(51) Int. Cl.
*G05D 23/19* (2006.01)
*G01J 5/10* (2006.01)
(Continued)

(52) U.S. Cl.
CPC ....... *G05D 23/1932* (2013.01); *F25D 17/065* (2013.01); *G01J 5/10* (2013.01); *G01K 1/20* (2013.01); *G01J 2005/0048* (2013.01)

(58) Field of Classification Search
CPC ...... G01K 1/20; G01J 2005/0048; G01J 5/10; F25D 17/065; G05D 23/1932
See application file for complete search history.

(56) References Cited

U.S. PATENT DOCUMENTS

2013/0223472 A1* 8/2013 Maston ................. G01K 15/00
374/2

FOREIGN PATENT DOCUMENTS

| CN | 1167931 A | 12/1997 |
|---|---|---|
| CN | 1534263 A | 10/2004 |

(Continued)

OTHER PUBLICATIONS

Asymptotic Theory of Statistics and Probability, Anirban DasGupta, Springer Texts in Statistics (Year: 2008).*
Data Acquisition Basics, Voler Systems (Year: 2009).*

*Primary Examiner* — Marc E Norman
*Assistant Examiner* — Schyler S Sanks
(74) *Attorney, Agent, or Firm* — Cheng-Ju Chiang

(57) ABSTRACT

Provided are a refrigerator, and a method for correcting temperature measurement errors of an infrared sensor including: verifying that the infrared sensor is running in an operating state; obtaining a measured operating-state value acquired by the infrared sensor sensing the temperature of a preset zone; obtaining a correction constant corresponding to the infrared sensor, the correction constant being obtained by means of a comparison between the value measured by the infrared sensor in a correction state and a standard temperature value; using the correction constant to correct the measured value and thus obtain a corrected temperature value. Using the method, the impact of an absolute error of
(Continued)

the infrared sensor on temperature measurement is reduced; thus the accuracy of temperature measurement is improved, such that measured values directly reflect the actual temperature of the items inside a preset zone, and an accurate basis for control is provided for subsequent associated control.

6 Claims, 11 Drawing Sheets

(51) Int. Cl.
  *F25D 17/06* (2006.01)
  *G01K 1/20* (2006.01)
  *G01J 5/00* (2006.01)

(56) References Cited

FOREIGN PATENT DOCUMENTS

| | | | |
|---|---|---|---|
| CN | 103575414 | A | 2/2014 |
| CN | 104614076 | A | 5/2015 |
| CN | 104990326 | A | 10/2015 |
| CN | 105157852 | A | 12/2015 |
| JP | 3983012 | B2 | 9/2007 |

* cited by examiner

REFRIGERATOR AND TEMPERATURE MEASUREMENT ERROR CORRECTING METHOD OF INFRARED SENSOR

CROSS REFERENCE TO RELATED APPLICATIONS

The present application is a 35 U.S.C. § 371 National Phase conversion of International (PCT) Patent Application No. PCT/CN2016/086191, filed on Jun. 17, 2016, which claims benefit of Chinese Application No. 201510367211.3, filed on Jun. 26, 2015, the disclosure of which is incorporated by reference herein. The PCT International Patent Application was filed and published in Chinese.

TECHNICAL FIELD

The present invention is related to a refrigeration device, and more particularly, to a refrigerator and a temperature measurement error correcting method of an infrared sensor.

BACKGROUND

An existing refrigerator usually uses a temperature sensor arranged inside a compartment to measure a temperature around the setting position of the temperature sensor, and takes the temperature as a basis of refrigeration control.

However, when controlled in that way, the refrigerator starts refrigeration when the temperature sensed by the temperature sensor is higher than a preset value. In practical use of the refrigerator, users usually need to store and fetch articles. In general, a temperature of an article just placed is relatively high, and it takes time for the temperature of the article to travel to the compartment by heat radiation. After the temperature of the article is transferred to the internal environment of the compartment, the temperature sensed by the temperature sensor will rise. Then, a cold source device such as a compressor and the like is started up to perform a refrigerating operation to the compartment. As such, the refrigeration control technology of the refrigerator in the prior art has a slow response speed and cannot meet the requirements of users with respect to the refrigeration effect of the refrigerator.

SUMMARY

One purpose of this invention is to improve temperature measurement precision.

Another purpose of this invention is to improve the effect of storing articles by the refrigerator.

Specially, this invention provides a temperature measurement error correcting method of an infrared sensor. The temperature measurement error correcting method of the infrared sensor comprises: confirming that the infrared sensor is running in an operation status; acquiring a measured value in the operation status by sensing a temperature of a preset region via the infrared sensor; acquiring a correction constant corresponding to the infrared sensor, by comparing a measured value sensed by the infrared sensor in a correction status with a standard temperature; and correcting the measured value in the operation status with the correction constant so as to acquire a corrected temperature.

Optionally, acquiring the correction constant by comparison comprises: acquiring a trigger signal for entering the correction status, and disabling at least one component which affects the temperature of the preset region so as to enter the correction status; respectively acquiring the measured value sensed by the infrared sensor in the correction status and the standard temperature measured by a standard temperature measuring device arranged in the preset region; calculating a difference between the measured value in the correction status and the standard temperature; and taking the difference as the correction constant.

Optionally, acquiring the measured value sensed by the infrared sensor in the correction status comprises: collecting a sensing result of the infrared sensor in the correction status once every first predetermined time so as to acquire a correction sampling value; successively acquiring a first predetermined number of the correction sampling values and removing a maximum correction sampling value and a minimum correction sampling value from the acquired correction sampling values; and calculating an average value of the remaining correction sampling values after removing the maximum correction sampling value and the minimum correction sampling value, as the measured value sensed by the infrared sensor in the correction status.

Optionally, after acquiring the correction sampling values, the method further comprises: determining whether the correction sampling values are within a preset normal value interval; if yes, sequentially storing the correction sampling values in a preset correction sampling value queue according to sampling time, wherein a length of the correction sampling value queue is equal to the first predetermined number; and if not, setting the correction sampling values as invalid data and removing the same, and outputting a prompt signal indicating abnormality of correction measurement when all the successive first predetermined number of temperature sampling values are invalid data.

Optionally, acquiring the standard temperature comprises: collecting a sensing result of the standard temperature measuring device once every second predetermined time so as to acquire a standard sampling value; successively acquiring a second predetermined number of the standard sampling values and removing a maximum standard sampling value and a minimum standard sampling value from the acquired standard sampling values; and calculating an average value of the remaining standard sampling values after removing the maximum standard sampling value and the minimum standard sampling value, as the standard temperature.

Optionally, after acquiring the standard sampling values, the method further comprises: determining whether the standard sampling values are within a preset normal value interval; if yes, sequentially storing the standard sampling values in a preset standard sampling value queue according to sampling time, wherein a length of the standard sampling value queue is equal to the second predetermined number; and if not, setting the standard sampling values as invalid data and removing the same, and outputting a prompt signal indicating abnormality of standard measurement when all the successive second predetermined number of standard sampling values are invalid data.

According to another aspect of this invention, there is also provided a refrigerator. The refrigerator comprises: a box body which defines a storage compartment therein; an infrared sensor provided in the storage compartment and configured to sense a temperature of a stored article in a preset storage space in the storage compartment; and a temperature calculating device connected with the infrared sensor and configured for: confirming that the infrared sensor is running in an operation status; acquiring a measured value in the operation status by sensing a temperature of the storage space via the infrared sensor; acquiring a correction constant corresponding to the infrared sensor by comparing a measured value sensed by the infrared sensor in a correction status with a standard temperature; and correcting the measured value in the operation status with the correction constant so as to acquire a corrected temperature.

Optionally, the refrigerator further comprises: a standard temperature measuring device provided in the storage compartment and configured to measure and acquire a standard temperature; and a correction constant calculating device, respectively connected with the infrared sensor and the standard temperature measuring device and configured for: acquiring a trigger signal for entering the correction status, and disabling at least one cold source device of the refrigerator so as to enter the correction status; respectively acquiring the measured value sensed by the infrared sensor in the correction status and the standard temperature measured by the standard temperature measuring device; calculating a difference between the measured value in the correction status and the standard temperature; and taking the difference as the correction constant.

Optionally, the storage compartment is divided into multiple storage spaces, each of which is provided with one or more infrared sensor for measuring a temperature of a stored article in the storage space; and the temperature calculating device is respectively connected with the multiple infrared sensors and configured to: respectively calculate corrected temperatures of the multiple storage spaces, as the bases for respectively controlling the temperatures of the multiple storage spaces.

Optionally, the refrigerator further comprises: a shunt air supply device configured to, assign to the multiple storage spaces, refrigeration air flow from a cold source; and a refrigeration controlling unit configured to: respectively compare the corrected temperature of each storage space with a region refrigeration-on temperature threshold preset for the each storage space, set a refrigeration status identity corresponding to a storage space where the corrected temperature is larger than the region refrigeration-on temperature threshold as ON, and drive the shunt air supply device to run to a status where the shunt air supply device supplies the refrigeration air flow to the storage space whose refrigeration status identity is ON.

According to a temperature measurement error correcting method of an infrared sensor of this invention, the measured value sensed by the infrared sensor in the operation status is corrected with the preset correction constant, the influence of the absolute error of the infrared sensor on temperature measurement is reduced, and the accuracy of the temperature measurement is improved, so that a measured value directly reflects an actual temperature of an article inside a preset region, and provides an accurate basis for follow-up control.

Further, according to a refrigerator of this invention, the foregoing measured value which accurately reflects the temperature of the stored articles inside the compartment of the refrigerator is taken as a control basis of the region-division refrigeration of the storage space, so that the position and temperature of the heat source in the compartment of the refrigerator can be accurately determined, thereby facilitating a control in accordance with the condition of the heat source, providing the best storage environment for the food in the refrigerator and reducing the nutrient loss of the food.

In accordance with the detailed description of specific embodiments of this invention in accompany with drawings, those skilled in the art will be more aware of the foregoing and other purposes, advantages and characteristics of this invention.

BRIEF DESCRIPTION OF THE DRAWINGS

Some special embodiments of this invention are described in detail in an illustrative manner rather than a restrictive manner with reference to drawings as follows. The same symbols in the drawings indicate the same or similar components or parts. Those skilled in the art should understand that these drawings may not be drawn in proportion.

DETAILED DESCRIPTION

Figure 1:
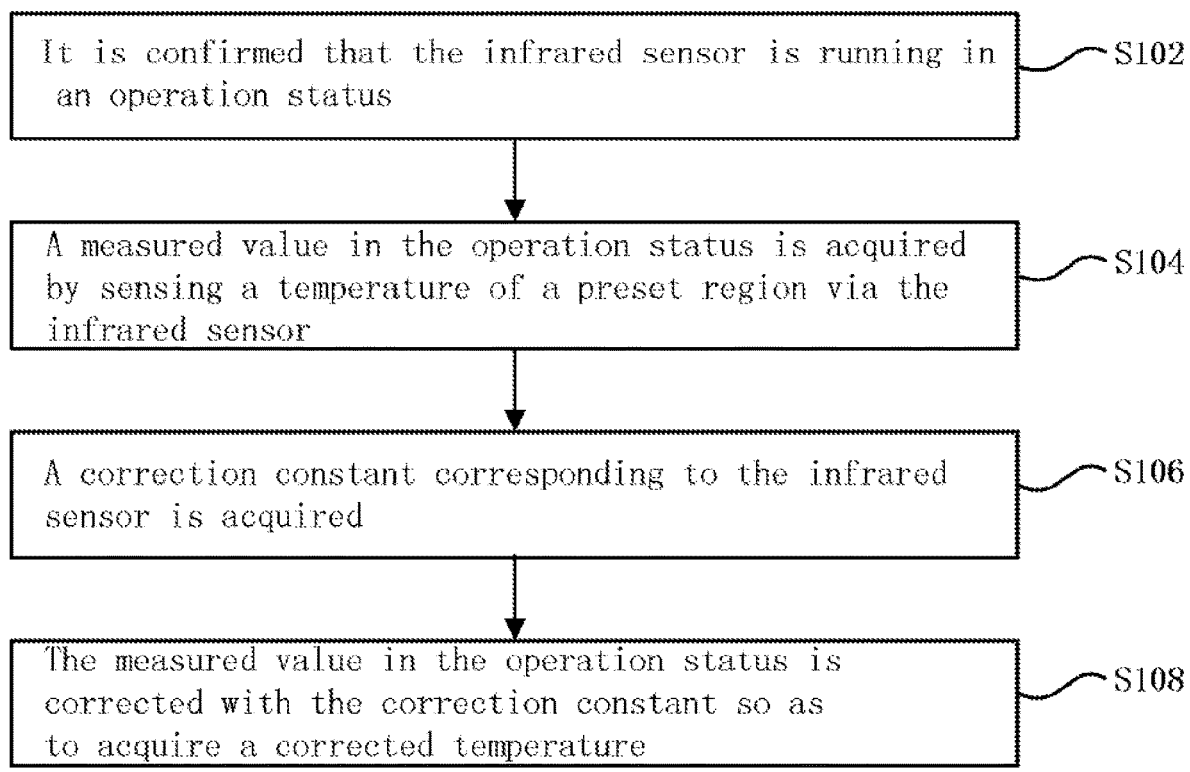
FIG. 1 is a schematic diagram illustrating a temperature measurement error correcting method of an infrared sensor in accordance with an embodiment of this invention.

An embodiment of this invention provides a temperature measurement error correcting method of an infrared sensor. FIG. 1 is a schematic diagram illustrating a temperature measurement error correcting method of an infrared sensor in accordance with an embodiment of this invention. The temperature measurement error correcting method of the infrared sensor comprises the following steps S102 to S108.

At step S102, it is confirmed that the infrared sensor is running in an operation status.

At step S104, a measured value in the operation status is acquired by sensing a temperature of a preset region via the infrared sensor.

At step S106, a correction constant corresponding to the infrared sensor is acquired.

At step S108, the measured value in the operation status is corrected with the correction constant so as to acquire a corrected temperature.

The infrared sensor used in the method of the embodiment does not emit infrared rays, but passively receives the infrared rays emitted by an article within the sensing scope as well as background infrared rays, and directly senses the temperature of the article in a preset region and converts the same to a corresponding electrical signal. Compared with a temperature sensor in the prior art, the infrared sensor can directly receive infrared rays emitted by the article to measure the temperature quickly, without the need for sensing the variation of the temperature after transmitting the temperature to a peripheral region of the temperature sensor, thereby realizing a fast response speed and a high accurate degree. The infrared sensor can limit a rectangular visual field by setting an infrared guide part, and improve detection precision by limiting a detection direction and position so as to implement an accurate detection of the preset region.

In addition, the infrared sensor has a fast response speed, but has an absolute error in the accuracy of temperature measurement in general. The absolute error is within the range of ±3° C. For each infrared sensor, the absolute error is basically a fixed value. Based on the above characteristics of the infrared sensor, according to a temperature measurement error correcting method of an infrared sensor of this embodiment, the correction constant is acquired by comparing the measured value of the infrared sensor in the correction status with the standard temperature. The correction constant reflects the absolute error of the infrared sensor.

The operation status in the step S102 may be an operation status where the infrared sensor performs temperature measurement so as to distinguish with the correction status of the infrared sensor.

Figure 2:
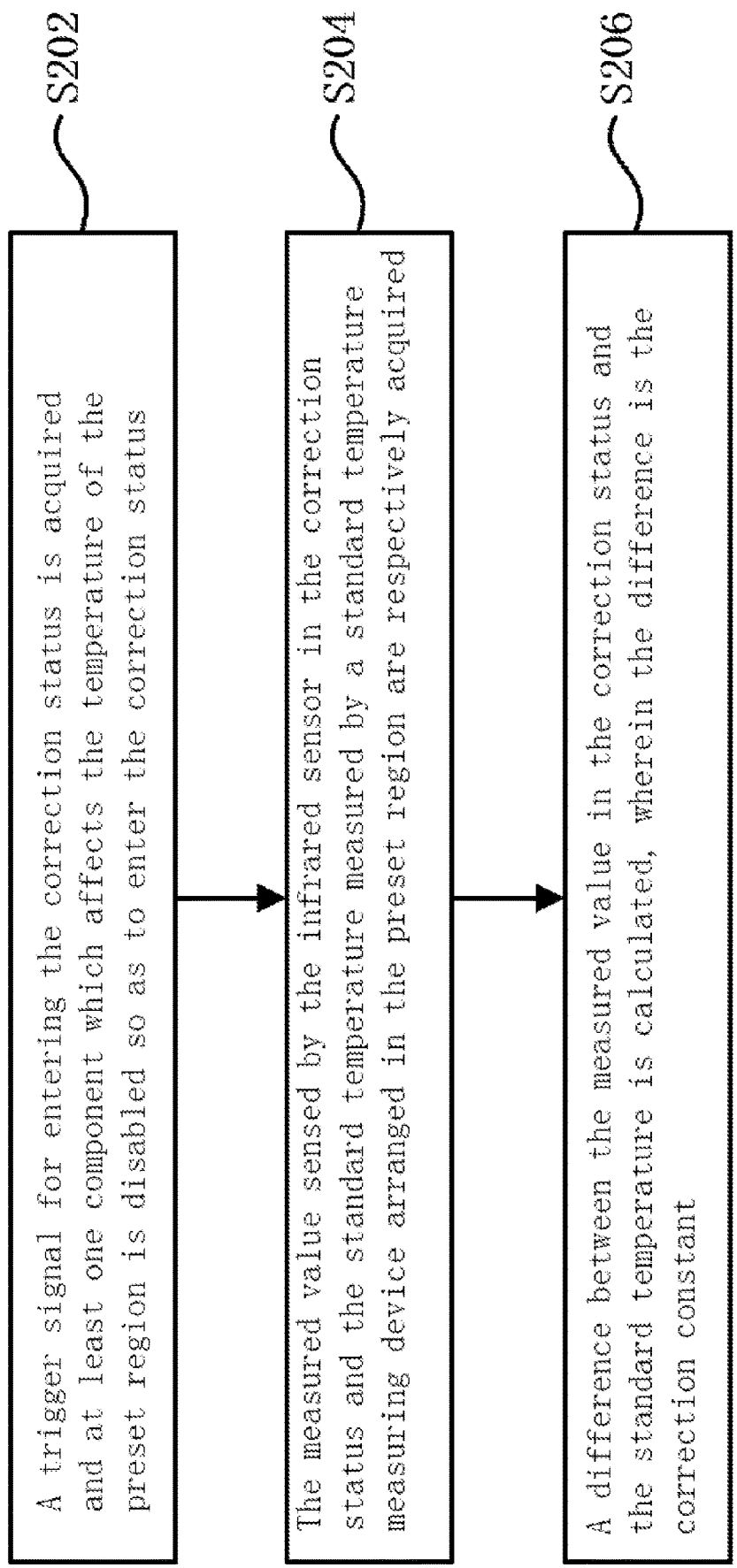
FIG. 2 is a flowchart illustrating acquiring a correction constant in a temperature measurement error correcting method of an infrared sensor in accordance with an embodiment of this invention.

FIG. 2 is a flowchart illustrating acquiring a correction constant in a temperature measurement error correcting method of an infrared sensor in accordance with an embodiment of this invention. Acquiring the correction constant by comparison comprises the following steps S202 to S206.

At step S202, a trigger signal for entering the correction status is acquired and at least one component which affects the temperature of the preset region is disabled so as to enter the correction status.

At step S204, the measured value sensed by the infrared sensor in the correction status and the standard temperature measured by a standard temperature measuring device arranged in the preset region are respectively acquired.

At step S206, a difference between the measured value in the correction status and the standard temperature is calculated. The difference is just the correction constant.

The trigger signal in the step S202 may be an instruction indicating the correction of the infrared sensor according to the external input, or a power-on signal for the first-time power on. The component affecting the temperature of the preset region may include a fan, a cold source and the like of various types. The infrared sensor is arranged inside a compartment of a refrigerator. When sensing the temperature of the stored article in the compartment of the refrigerator, the infrared sensor of the refrigerator enters the correction status. It is possible to close the door body of the refrigerator and disable all components in a refrigeration system. In the correction status, the preset region is maintained as a steady status, so that the correction constant can be closer to the absolute error of the infrared sensor.

In order to avoid the deviation of the correction constant due to the measure fluctuation of the infrared sensor and the standard temperature measuring device, in this embodiment, when acquiring the measured value sensed by the infrared sensor in the correction status and the standard temperature in the step S204, it may be implemented by calculating an average value of multiple sampling values.

Acquiring the measured value sensed by the infrared sensor in the correction status may comprise: collecting a sensing result of the infrared sensor in the correction status once every first predetermined time so as to acquire a correction sampling value; successively acquiring a first predetermined number of the correction sampling values and removing a maximum correction sampling value and a minimum correction sampling value from the acquired correction sampling values; and calculating an average value of the remaining correction sampling values after removing the maximum correction sampling value and the minimum correction sampling value, as the measured value sensed by the infrared sensor in the correction status.

Further, in order to avoid abnormal data or failures occurring in the infrared sensor, after acquiring a correction sampling value, the method may further comprise: determining whether the correction sampling values are within a preset normal value interval; if yes, sequentially storing the correction sampling values to a preset correction sampling value queue according to sampling time, wherein a length of the correction sampling value queue is equal to the first predetermined number; and if not, setting the correction sampling values as invalid data and removing the same, and outputting a prompt signal indicating abnormality of correction measurement when all the successive first predetermined number of temperature sampling values are invalid data.

Acquiring the standard temperature may comprise: collecting a sensing result of the standard temperature measuring device once every second predetermined time so as to acquire a standard sampling value; successively acquiring a second predetermined number of the standard sampling values and removing a maximum standard sampling value and a minimum standard sampling value from the acquired standard sampling values; and calculating an average value of the remaining standard sampling values after removing the maximum standard sampling value and the minimum standard sampling value, as the standard temperature.

Further, in order to avoid abnormal data or failures occurring in the standard temperature measuring device, after acquiring the standard sampling value, the method may further comprise: determining whether the standard sampling values are within a preset normal value interval; if yes, sequentially storing the standard sampling values in a preset standard sampling value queue according to sampling time, wherein a length of the standard sampling value queue is equal to the second predetermined number; and if not, setting the standard sampling values as invalid data and removing the same, and outputting a prompt signal indicating abnormality of standard measurement when all the successive second predetermined number of standard sampling values are invalid data.

The temperature measurement error correcting method of the infrared sensor of this embodiment may give priority to the error correction of the infrared sensor for measuring the temperature of the stored article in the refrigerator so as to ensure the accuracy of the measured temperature in the compartment of the refrigerator, facilitate a control in accordance with the condition of the heat source, provide the best storage environment for the food in the refrigerator and reduce the nutrient loss of the food.

The process of determining the correction constant may be implemented after the assembly of the refrigerator on the production line. When determining the correction constant, since the refrigerator has never been refrigerated, the temperature in the storage compartment of the refrigerator is basically uniform and may be calibrated before the refrigeration performance test. In addition, the foregoing standard temperature measuring device may be a temperature measuring device placed in the storage compartment of the refrigerator. In a preferred embodiment, a thermistor for measuring internal environment temperature of the compartment of the refrigerator may be taken as the standard temperature measuring device. Usually, the storage compartment of the refrigerator is equipped with an NTC (Negative Temperature Coefficient, a thermistor with a negative temperature coefficient), and its absolute error is generally within the range of ±0.5° C. and can meet the requirement of the correction through the correction constant.

Figure 3:
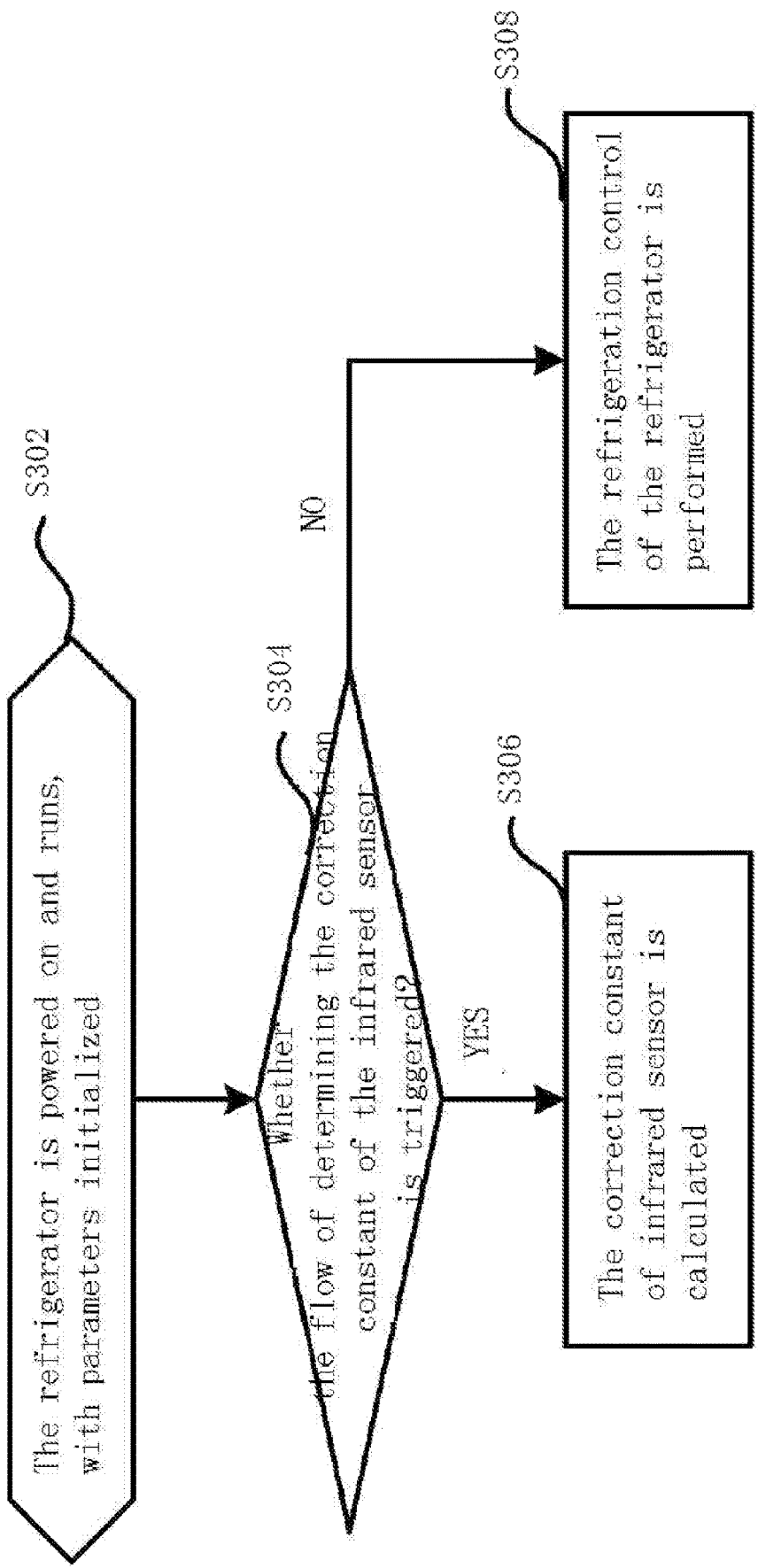
FIG. 3 is a schematic diagram illustrating a case where a temperature measurement error correcting method of an infrared sensor in accordance with an embodiment of this invention is used in the initialization of a refrigerator.

FIG. 3 is a schematic diagram illustrating a case where a temperature measurement error correcting method of an infrared sensor in accordance with an embodiment of this invention is used in the initialization of a refrigerator. After powered on, the refrigerator may perform the following steps S302 and S304 in turn.

At step S302, the refrigerator is powered on and runs, with parameters initialized. The initialization includes: updating a correction sampling value queue and clearing a standard sampling value queue respectively. The queue length of the correction sampling value queue is a first predetermined number S1 and the queue length of the standard sampling value queue is a second predetermined number S2. The sequence identity of the sampling value queue is initialized by s1=0. The sequence identity of the standard value queue is initialized by s2=0. The alarm prompt identity of the correction value is initialized by Err1=0. The alarm prompt identity of the standard value is initialized by Err2=0.

At step S304, it is judged whether the flow of determining the correction constant of the infrared sensor is triggered. If yes, the calculation for the correction constant of the infrared sensor at step S306 is performed. If not, the refrigeration control of the refrigerator at step S308 is performed. At step S304, after the power-on signal is acquired, it is determined by detecting a stored value of a storage mean with respect to the correction constant. If the stored value is a default value, it means the correction constant has not been determined. If the stored value is modified, it means the correction constant has been determined and can directly enter into the instruction control flow of the refrigerator.

Figure 4:
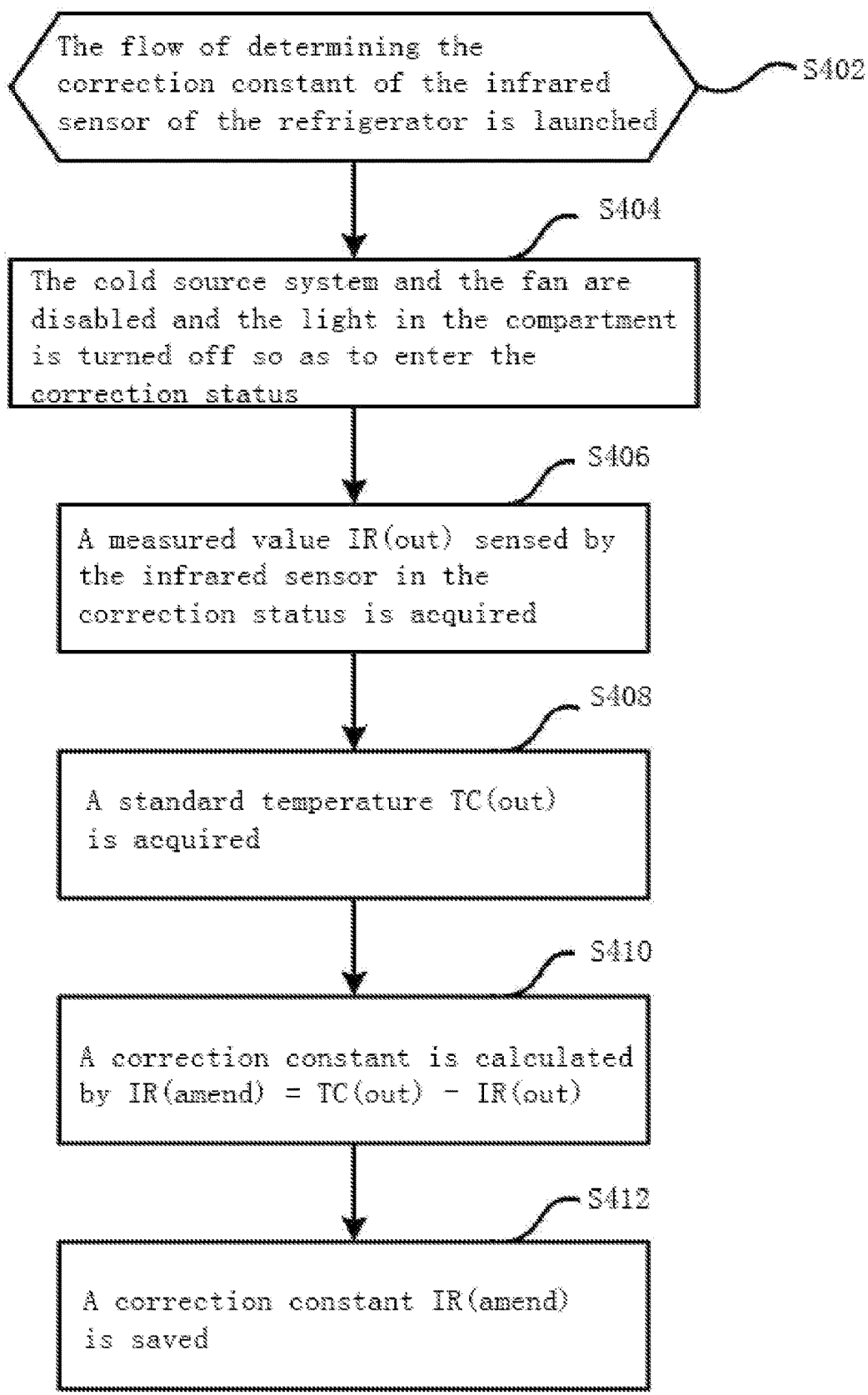
FIG. 4 is a flowchart illustrating determining of a correction constant in a case where a temperature measurement error correcting method of an infrared sensor in accordance with an embodiment of this invention is used in a refrigerator.

FIG. 4 a flowchart illustrating determining of a correction constant in a case where a temperature measurement error correcting method of an infrared sensor in accordance with an embodiment of this invention is used in a refrigerator. The flow comprises the following steps S402 to S412.

At step S402, the flow of determining the correction constant of the infrared sensor of the refrigerator is launched.

At step S404, the cold source system and the fan are disabled and the light in the compartment is turned off so as to enter the correction status and keep the inner environment of the compartment of the refrigerator stable.

At step S406, a measured value IR (out) sensed by the infrared sensor in the correction status is acquired.

At step S408, a standard temperature TC (out) is acquired.

At step S410, a correction constant is calculated by IR (amend)=TC (out)−IR (out).

At step S412, a correction constant IR (amend) is saved for use in temperature measurement bye the refrigerator.

In the step S406 and step S408, the IR (out) and TC (out) may be acquired by calculating an average value of multiple sampling values.

Figure 5:
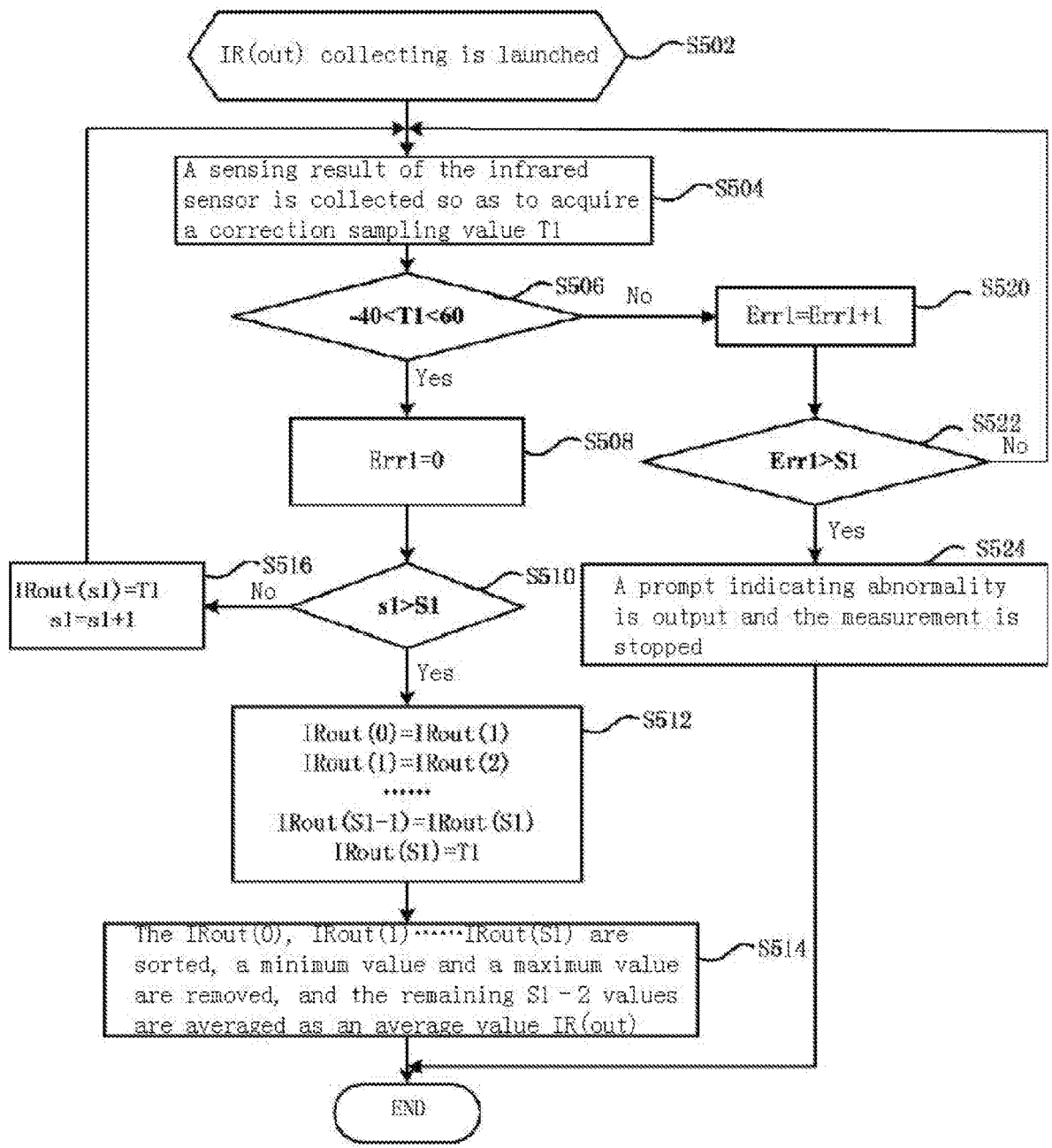
FIG. 5 is a flowchart illustrating acquiring of a measured value sensed by an infrared sensor in a correction status in a temperature measurement error correcting method of an infrared sensor in accordance with an embodiment of this invention.

FIG. 5 is a flowchart illustrating acquiring of a measured value sensed by an infrared sensor in a correction status in a temperature measurement error correcting method of an infrared sensor in accordance with an embodiment of this invention. The flow comprises the following steps S502 to S524.

At step S502, the flow of collecting the measured value IR (out) sensed by the infrared sensor in the correction status is launched.

At step S504, a sensing result of the infrared sensor is collected so as to acquire a correction sampling value T1.

At step S506, it is determined whether T1 is within a normal value interval. For example, it is determined whether −40<T1<60. If yes, T1 is taken as a normal datum and the step S508 is performed. If not, T1 is taken as an abnormal datum and the step S520 is performed.

At step S508, Err1 is cleared and then Err1=0.

At step S510, it is determined whether the number of the correction sampling value meets the requirements. That is, it is determined whether s1>S1. When the value of S1 is 10, it is determined whether s1 is larger than 10. If yes, collecting is finished and the step S512 is performed. If not, the next collecting is entered and the step S516 is performed.

At step S512, the correction value queue is adjusted. That is, IRout(0)=IRout(1), IRout(1)=IRout(2), . . . IRout(S1−1)=IRout(S1), IRout(S1)=T1, forming a cyclic storage queue. In other words, the initial sampling value is overwritten.

At step S514, the IRout(0), IRout(1) IRout(S1) are sorted, a minimum sampling value IRoutmin and a maximum sampling value IRoutmax are removed, and the remaining S1−2 values are averaged as an average value IRout. The calculation formulation is as follows.

$$IRout=(IRout(0)+IRout(1)+ \ldots +IRout(S1)-IRoutmax-IRoutmin)/(S1-2);$$

At step S518, the next collection of the sensing result is entered. IRout(s1)=T1, s1=s1+1, and return to S504.

At step S520, the sampling value alarm prompt identity is accumulated at the first time, Err1=Err1+1.

At step S522, it is determined whether all the successive predetermined number of collected values is invalid data. That is whether Err1>S1 occurs. If yes, the step S524 is performed. If not, return to step S504.

At step S524, a prompt indicating abnormality is output and the measurement is stopped.

The IRout acquired through the foregoing flow eliminates measurement fluctuations and abnormal data of the infrared sensor, so it becomes more accurate. During the foregoing process of collecting the correction sampling values, the collecting frequency may be set as once every 0.1 seconds and the length of the correction sampling value storage queue may be set as 10. However, the specific value may be adjusted according to test results.

Figure 6:
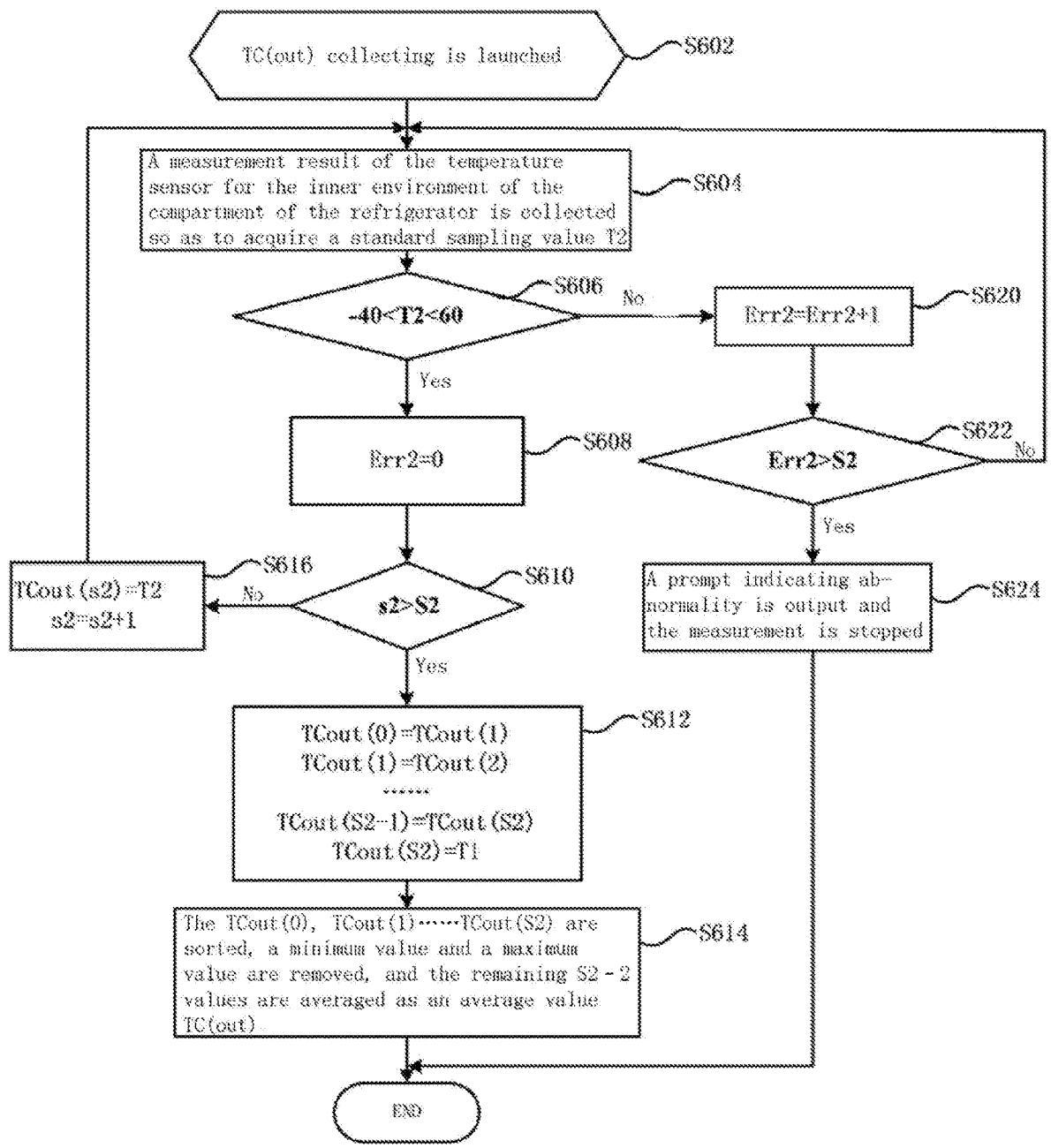
FIG. 6 is a flowchart illustrating acquiring of a measured value sensed by an infrared sensor in a correction status in a temperature measurement error correcting method of an infrared sensor in accordance with an embodiment of this invention.

FIG. 6 is a flowchart illustrating acquiring of a measured value sensed by an infrared sensor in a correction status in a temperature measurement error correcting method of an infrared sensor in accordance with an embodiment of this invention. The flow comprises the following steps S602 to S624.

At step S602, the flow of collecting the measured value IR(out) sensed by the infrared sensor in the correction status is launched At step S604, a measurement result of the temperature sensor for the inner environment of the compartment of the refrigerator is collected so as to acquire a standard sampling value T2.

At step S606, it is determined whether T2 is within a normal value interval. For example, it is determined whether −40<T2<60. If yes, T2 is taken as a normal datum and the step S608 is performed. If not, T2 is taken as an abnormal datum and the step S620 is performed.

At step S608, Err2 is cleared and Err2=0.

At step S610, it is determined whether the number of the standard sampling values meets the requirements. That is, it is determined whether 2>S1. When the value of S2 is 20, it is determined whether s1 is larger than 20. If yes, collecting is finished and the step S612 is performed. If not, the next collecting is entered and the step S616 is performed.

At step S612, the standard value queue is adjusted. That is, TCout(0)=TCout(1), TCout(1)=TCout(2), ... TCout(S2−1)=TCout(S2), TCout(S)=T2, forming a cyclic storage queue. In other words, the initial sampling value is overwritten.

At step S614, the TCout(0), TCout(1) TCout(S2) are sorted, a minimum sampling value TCoutmin and a maximum sampling value TCoutmax are removed, and the remaining S2−2 values are averaged as an average value TCout. The calculation formulation is as follows.

$$TCout=(TCout(0)+TCout(1)+ \ldots +TCout(S2)-TCoutmax-TCoutmin)/(S2-2)$$

At step S618, the next collection of the sensing result is entered. TCout(s2)=T1, s2=s2+1, and return to S604.

At step S620, the standard sampling value alarm prompt identity is accumulated at the first time, Err2=Err2+1.

At step S622, it is determined whether all the successive predetermined number of standard sampling values is invalid data. That is whether Err2>S2 occurs. If yes, the step S624 is performed. If not, return to step S604.

At step S624, a prompt indicating abnormality is output and the measurement is stopped.

The TCout acquired through the foregoing flow eliminates measurement fluctuations and abnormal data of the temperature sensor (e.g., NTC) in the compartment environment, so it becomes more accurate.

During the foregoing process of collecting the standard sampling values, the collecting frequency may be set as once every 0.1 seconds and the length of the correction sampling value storage queue may be set as 20. However, the specific value may be adjusted according to test results.

When the refrigerator is in the correction status, the inner environment of the compartment needs to keep stable and avoid temperature fluctuations as far as possible, so it is usually chosen to make an implementation during the first power test after the assembly of the refrigerator. The acquired correction constant IR(amend) may be used in the refrigerator for subsequent testing or temperature measurement. By removing abnormal data and giving an alarm prompt, the failures on the infrared sensor and the temperature sensor of the compartment environment of the refrigerator can be detected.

Figure 7:
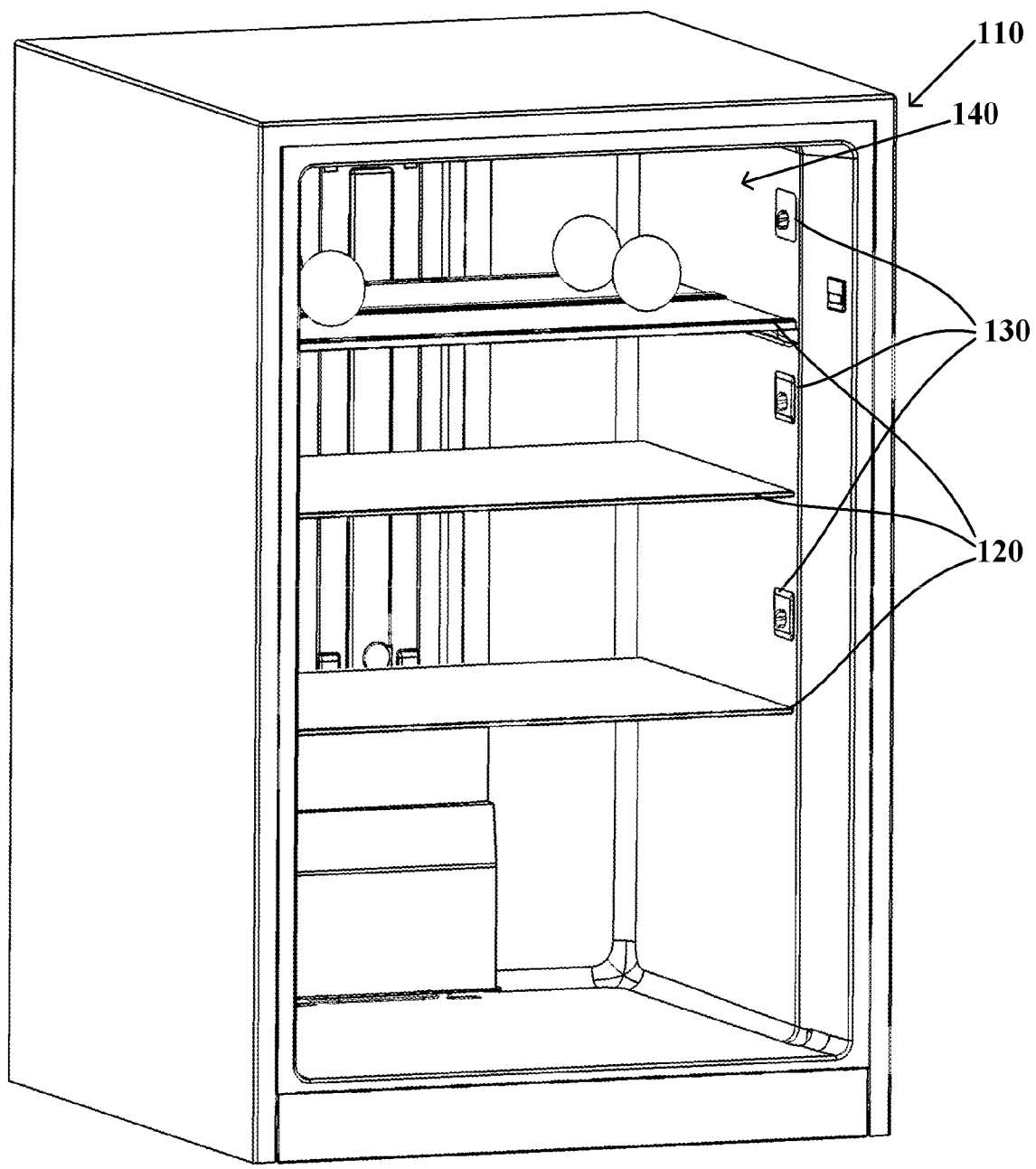
FIG. 7 is a schematic diagram illustrating a structure of a refrigerator in accordance with an embodiment of this invention.
Figure 8:
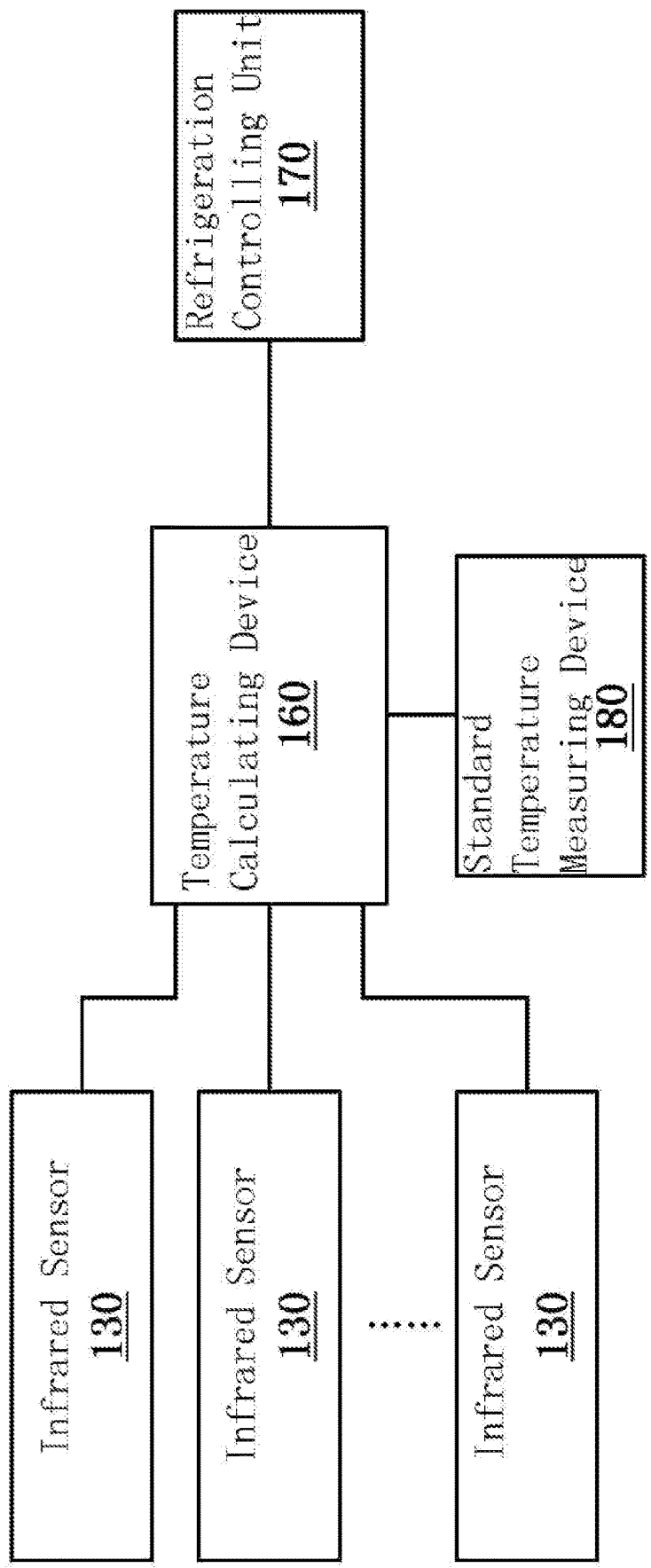
FIG. 8 is a block diagram illustrating a control component of a refrigerator in accordance with an embodiment of this invention.

This embodiment further provides a refrigerator, which uses a temperature measurement error correcting method of an infrared sensor according to the foregoing embodiment to obtain a corrected temperature as a basis of temperature control. FIG. 7 is a schematic diagram illustrating a structure of a refrigerator in accordance with an embodiment of this invention. FIG. 8 is a block diagram illustrating a control component of a refrigerator in accordance with an embodiment of this invention. The refrigerator generally comprises: a box body 110, an infrared sensor 130 and a temperature calculating device 160, a refrigeration controlling unit 170, a standard temperature measuring device 180.

The box body 110 comprises and is surrounded by a top wall, a bottom wall, a rear wall and two side walls respectively arranged left and right. A door body (not shown in the figures) is arranged in front of the box body 110. The door body may be connected with the side wall by a pivot structure. A storage compartment (e.g., a refrigeration compartment) is defined in the box body 110 and may be divided into multiple storage spaces 140.

The infrared sensor 130 is provided in the storage compartment and configured to sense a temperature of a stored article in the storage space in the storage compartment. The number of the infrared sensor 130 is set based on the number of the storage space 140. In general, each storage space 140 may be provided with one infrared sensor 130. In a case where the storage space 140 has a larger width, the infrared sensor 130 may not fully sense the overall situation of the storage space 140. So one storage space 140 may be provided with multiple infrared sensors 130. In a preferred way, two infrared sensors are arranged in the inner side of the two side walls of the box body so as to jointly implement the temperature measurement to the storage space 140.

In another way for the configuration of the infrared sensor 130, a transmission device (screw transmission, synchronous belt transmission, etc.) is used to drive the infrared sensor 130 to move in the multiple storage spaces so as to respectively measure the temperatures of the multiple storage spaces 140.

In order to improve the sensing precision of the temperature of the article in the storage space 140 by the infrared sensor 130 and meet the refrigerator requirement of the compartment of the refrigerator, the inventors have made a lot of tests and then conclude a preferred assembly position and a preferred configuration method of the infrared sensor 130. The height of the infrared sensor 130 in the storage space 140 is higher than half the overall height of the storage space 140 (as a better range, higher than or located at ⅔ of the overall height of the storage space 140). The angle range of the infrared receiving center line of each infrared sensor 130 is set as 70 degrees to 150 degrees (as a better range, 76 degrees to 140 degrees) with respect to an upward vertical line. The angle range between the horizontal projection of the infrared receiving center line of each infrared sensor 130 and the side wall where the infrared sensor 130 located is set as 30 degrees to 60 degrees (as a better range, 30 degrees to 45 degrees).

The infrared sensor 130 does not emit infrared rays, but passively receives the infrared rays emitted by an article within the sensing scope as well as background infrared rays, and directly senses the temperature variation region of the article in the storage space 140 and converts the same to a corresponding electrical signal.

The storage compartment of the refrigerator of this invention may be divided into multiple storage spaces 140. For example, a rack unit 120 divides the storage compartment into multiple storage spaces 140. One of the preferred structures is that the rack unit 120 includes at least one horizontally disposed division plate to separate the compartment into multiple storage spaces 140 along the vertical direction. In FIG. 1, the rack unit 120 comprises a first division plate, a second division plate and a third division plate. A first storage space is formed above the first division plate. A second storage space is formed between the first division plate and the second division plate. A third storage space is formed between the second division plate and the third division plate. In some other embodiments of this invention, the number of the division plates in the rack unit 120 and the number of the storage spaces 140 may be preset according to the volume of the refrigerator and use requirements. Each storage space 140 is provided with one or more infrared sensor 130 for measuring the temperature of the article stored inside.

The temperature calculating device 160 is coupled with the infrared sensor 130 via signals and configured for: confirming that the infrared sensor 130 is running in an operation status; acquiring a measured value in the operation status by sensing a temperature of the storage space 140 via the infrared sensor 130; acquiring a correction constant IR(amend) corresponding to the infrared sensor 130 by comparing a measured value IR(out) sensed by the infrared sensor 130 in a correction status with a standard temperature TC(out); and correcting the measured value in the operation status with the correction constant so as to acquire a corrected temperature. The temperature calculating device 160 may respectively implement temperature calculation to multiple infrared sensors 130 in multiple storage spaces so as to respectively obtain the actual temperatures of the articles in the multiple storage spaces. The foregoing operation status refers to a status where the infrared sensor 130 performs temperature measurement so as to distinguish with the correction status of the infrared sensor 130.

The temperature calculating device 160 may also adopt a way similar to that in FIG. 5 and FIG. 6 to acquire the measured value in the operation status, which can eliminate the influence of measurement fluctuations. If a successive predetermined number of the measured values in the operation status are all invalid data, the infrared sensor is stopped from sensing the temperature the preset region and a prompt signal indicating abnormality of temperature measurement is output. The abnormality prompt signal may be displayed via a display screen of the refrigerator, or be reported to a mobile terminal of a user pre-bundled with the refrigerator via networks.

In a case where the storage compartment is separated into multiple storage spaces 140, each storage space 140 may be provided with one or more infrared sensor 130 for measuring the temperature of the article stored inside. In addition, the temperature calculating device 160 is respectively connected with the infrared sensors 130 respectively arranged in the multiple storage spaces 140. The temperature calculating device 160 may respectively calculate and obtain the corrected temperatures of the multiple storage spaces, as the basis of controlling temperatures of the multiple storage spaces 140. In a case where one storage space 140 is provided with multiple infrared sensors 130, the temperature calculating device 160 may calculate a difference between a maximum value and a minimum value among the temperature values measured by multiple infrared sensors in the same storage space 140, determine a weight coefficient k of the maximum value and a weight coefficient m of the minimum value based on the size of the difference, respectively take the weight coefficient k of the maximum value and the weight coefficient m of the minimum value as the weight coefficients of the maximum temperature and the minimum temperature, weight and calculate the maximum temperature and the minimum temperature, and take the weighted and calculated result as a sensed temperature value of the storage space 140. The calculation formulation is as follows. The sensed temperature value IRT=IRTmax*k+ IRTmin*m, wherein the IRTmax is the maximum temperature, the IRTmin is the minimum temperature. The IRT is taken as the refrigeration control basis of the storage space 140.

The refrigerator in this embodiment may further comprise a shunt air supply device and a refrigeration controlling unit 170. The shunt air supply device may be configured to assign, to the multiple storage spaces 140, refrigeration air flow from a cold source. The refrigeration controlling unit 170 may be configured to: respectively compare the corrected temperature of each storage space 140 with a region refrigeration-on temperature threshold preset for the each storage space 140, set a refrigeration status identity corresponding to a storage space where the corrected temperature is larger than the region refrigeration-on temperature threshold as ON, and drive the shunt air supply device to run to a status where the shunt air supply device supplies the refrigeration air flow to the storage space whose refrigeration status identity is ON.

Figure 9:
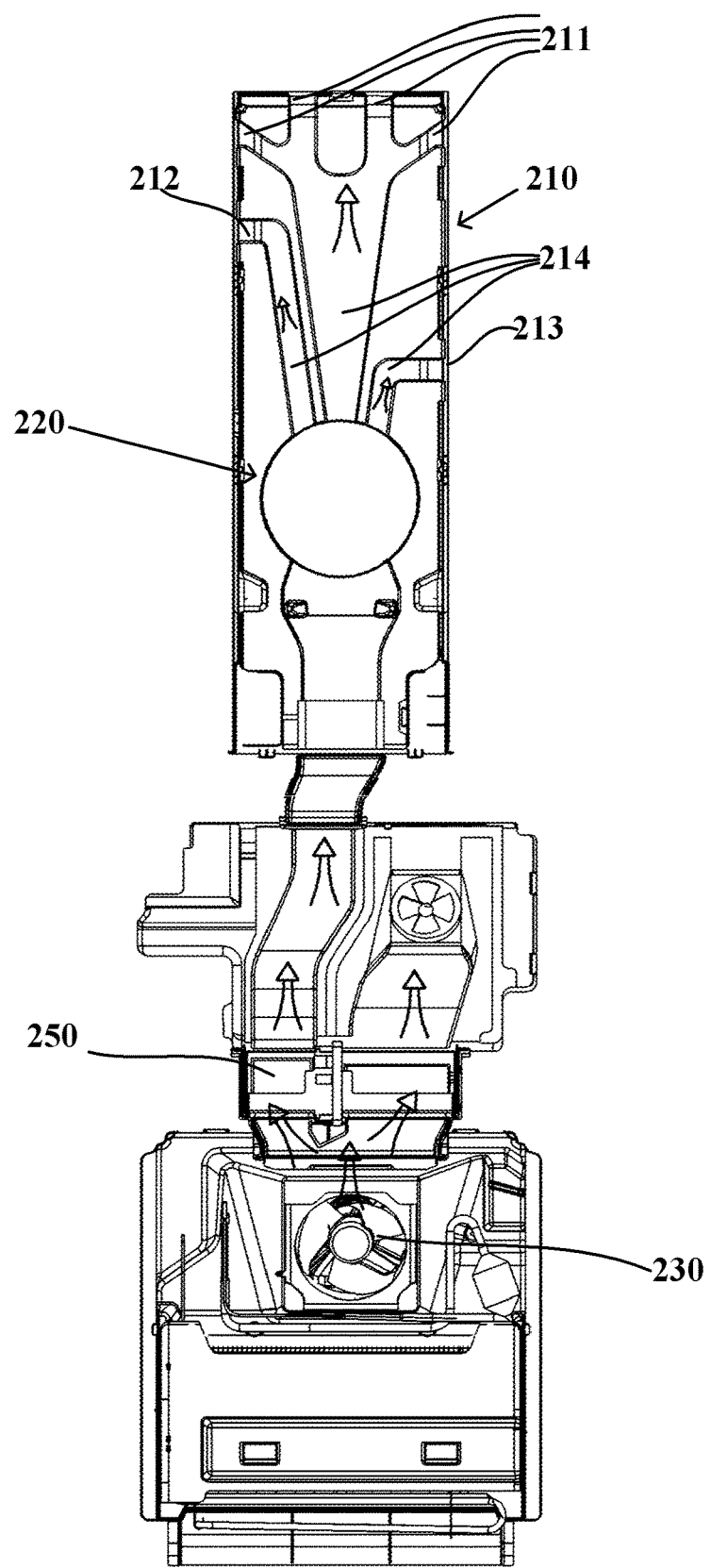
FIG. 9 is a schematic diagram illustrating a refrigeration system of a refrigerator in accordance with an embodiment of this invention.
Figure 10:
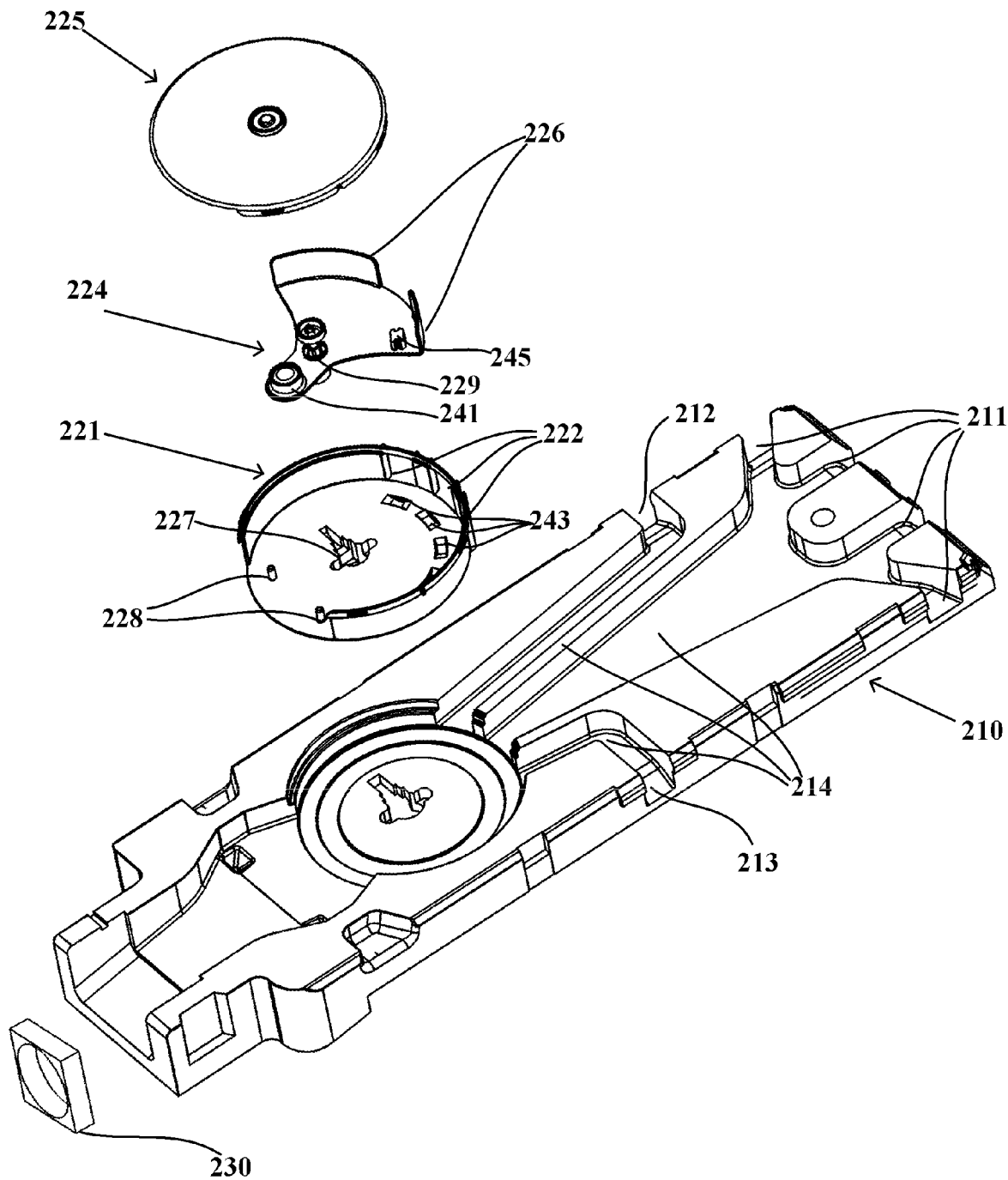
FIG. 10 is a schematic diagram illustrating a structure of a refrigeration system of a refrigerator in accordance with an embodiment of this invention.

FIG. 9 is a schematic diagram illustrating a refrigeration system of a refrigerator in accordance with an embodiment of this invention. FIG. 10 is a schematic diagram illustrating a structure of a refrigeration system of a refrigerator in accordance with an embodiment of this invention. The refrigeration system comprises: an air passage unit, a compressor, a refrigerating air door 250, a fan 230, etc. The refrigerator may be provided with a refrigeration loop consisting of components such as an evaporator, a compressor, a condenser, a throttling element and the like which pass through a refrigeration pipe, and allow the evaporator to release cooling capacity after the compressor is started up.

The evaporator may be provided in an evaporator compartment. The air cooled by the evaporator cooling is transmitted to a storage compartment via the fan 230. For example, the interior of the storage compartment of the refrigerator may be divided into a variable temperature compartment, a refrigeration compartment and a freezing compartment. The upmost layer of the storage compartment is the refrigeration compartment, the variable temperature compartment is below the refrigeration compartment, and the freezing compartment is below the variable temperature compartment. The evaporator compartment may be provided at the rear part of the freezing compartment. The fan 230 is arranged at the outlet above the evaporator compartment. Accordingly, an air supply path for the air cooled by the evaporator includes: a temperature variation air supply path communicated with the variable temperature compartment, for supplying air to the variable temperature compartment; a freezing air supply path communicated with the freezing compartment, for supplying air to the freezing compartment; and a refrigerating air supply path communicated with the refrigeration compartment, for supplying air to the refrigeration compartment.

In this embodiment, the air passage unit is an air path system for supplying air to the refrigeration compartment. The air passage unit comprises: an air passage floor plate 210, a shunt air supply device 220 and a fan 230. Multiple air paths 214 respectively leading to multiple storage spaces 140 are provided on the air passage floor plate 210. Each air path 214 leads to a different storage space 140. For example, in the embodiment illustrated in FIG. 1, it may include: a first air outlet 211 communicated with a first storage space; a second air outlet 212 communicated with a second storage space; and a third air outlet 213 communicated with a third storage space.

The shunt air supply device 220 is provided on the refrigerating air supply path. The refrigerating air supply path is formed at the back of the refrigeration compartment.

The shunt air supply device 220 comprises: an air inlet 221 connected with a cold source (e.g., an evaporator compartment) and multiple allocation openings 222 respectively connected with multiple air paths 214. The allocation openings 222 are respectively connected with different air paths 214. The shunt air supply device 220 may controllably allocate to different allocation openings 222, the cooling air generated by the fan 230 from a cold source via the air inlet 221, so that the cooling air can enter different storage spaces 140 of the refrigeration compartment via different air paths 214.

The shunt air supply device 220 may implement a centralized allocation of the refrigeration air from the cold source, rather than provide a different air passage for each different storage space 140, thereby improving the refrigeration efficiency. The shunt air supply device 220 may comprise: a casing 221, an adjusting member 224 and a cover plate 225. An air inlet 221 and an allocation opening 222 are provided on the casing 221. The cover plate 225 is assembled with the casing 221 to form a shunt air supply cavity. The adjusting member 224 is arranged in the shunt air supply cavity. The adjusting member 224 has at least one covering portion 226, which is movably provided in the casing 221 and configured to controllably cover the multiple allocation openings 222 so as to adjust a respective air outlet area of each of the multiple allocation openings 222.

The air blew from the fan 230 is supplied to different storage spaces 140 by the allocation of the adjusting member 224, and the shunt air supply device 220 can achieve up to seven kinds of air supply status as follows. For example, the allocation opening 222 allocated to the first air outlet 211 is opened alone, the allocation opening 222 allocated to the second air outlet 212 is opened alone, the allocation opening 222 allocated to the third air outlet 213 is opened alone, the allocation opening 222 allocated to the first air outlet 211 and the allocation opening 222 allocated to the second air outlet 212 are opened simultaneously, the allocation opening 222 allocated to the first air outlet 211 and the allocation opening 222 allocated to the third air outlet 213 are opened simultaneously, the allocation opening 222 allocated to the second air outlet 212 and the allocation opening 222 allocated to the third air outlet 213 are opened simultaneously, and the allocation opening 222 allocated to the first air outlet 211, the allocation opening 222 allocated to the second air outlet 212 and the allocation opening 222 allocated to the third air outlet 213 are opened simultaneously. When the refrigerator in this embodiment is divided into two storage spaces by the division plate, the shunt air supply device 220 may be provided with two allocation openings and simultaneously three air supply status. At the time of the shunt air supply, the adjusting member 224 will rotate and the rotation angle will be determined based on the required air volume. In addition, a guide opening formed between covering portions 226 will be aligned with a corresponding allocation opening 222.

The casing 221 is provided with a motor 227, two stop columns 228 and a positioning seat groove 243 in the shunt air supply cavity. The stop column 228 plays a role that the motion of the adjusting member 224 is more accurate during the operation of the motor 227 and that the adjusting member 224 is moved to a beginning stop column 228 to rotate as a starting point to a disappointed rotation position each time the power is supplied or after a period of time. The positioning seat groove 243 is used to ensure that the adjusting member 224 is positioned at an angel of 30 degrees per rotation. A disc spring 229 (the disc spring 229 may also be replaced by a torsion spring), a counterweight block 241 and a positioning pin 245 are provided on the adjusting member 224. One end of the disc spring 229 is fixed on the cover plate 225, and the other end is applied with a reverse force in accompany with the operation of the adjusting member 224 and always apply a certain bias force to the adjusting member 224, thereby inhibiting the sloshing due to a backlash of a transmission mechanism of a DC stepping motor 227. A counterweight portion is formed by extending from a pivotal portion towards a direction opposite to radial direction of the main body of the adjusting member 224. A counterweight block 241 is provided at the far-end of the counterweight portion so as to eliminate a bias torque. The positioning pin 245 is movably upward and downward (by means of a pressure spring) fixed on the adjusting member 224. The casing 221 is provided with a positioning seat groove 243 cooperating with it thereon.

It is to be noted that, although the refrigerator has a compartment provided with three storage spaces 140 in this embodiment as an example, the numbers of the infrared sensor 130, the air path 214, the allocation opening 222 and the air outlet may be set to meet requirements of different refrigerators according to particular use needs in practical use. For example, according to the above description, it is easy to get an air supply system of a refrigeration compartment provided with two storage spaces 140.

The refrigeration controlling unit 170 drives the shunt air supply device to run to a status where the shunt air supply device supplies the refrigeration air flow to the storage space 140 whose refrigeration status identity is ON. It realizes more accurate control and ensures that the refrigeration control is implemented according to the storage situation of the articles in the storage space 140, thereby preventing a waste of electrical power due to refrigeration on the overall compartment. Further, the refrigerator in this embodiment can also rapidly cool articles with higher temperatures, reduce the influence of the articles with higher temperatures on other stored articles, improve the storage effect of the refrigeration compartment in the refrigerator and reduce the nutrient loss of the food.

Figure 11:
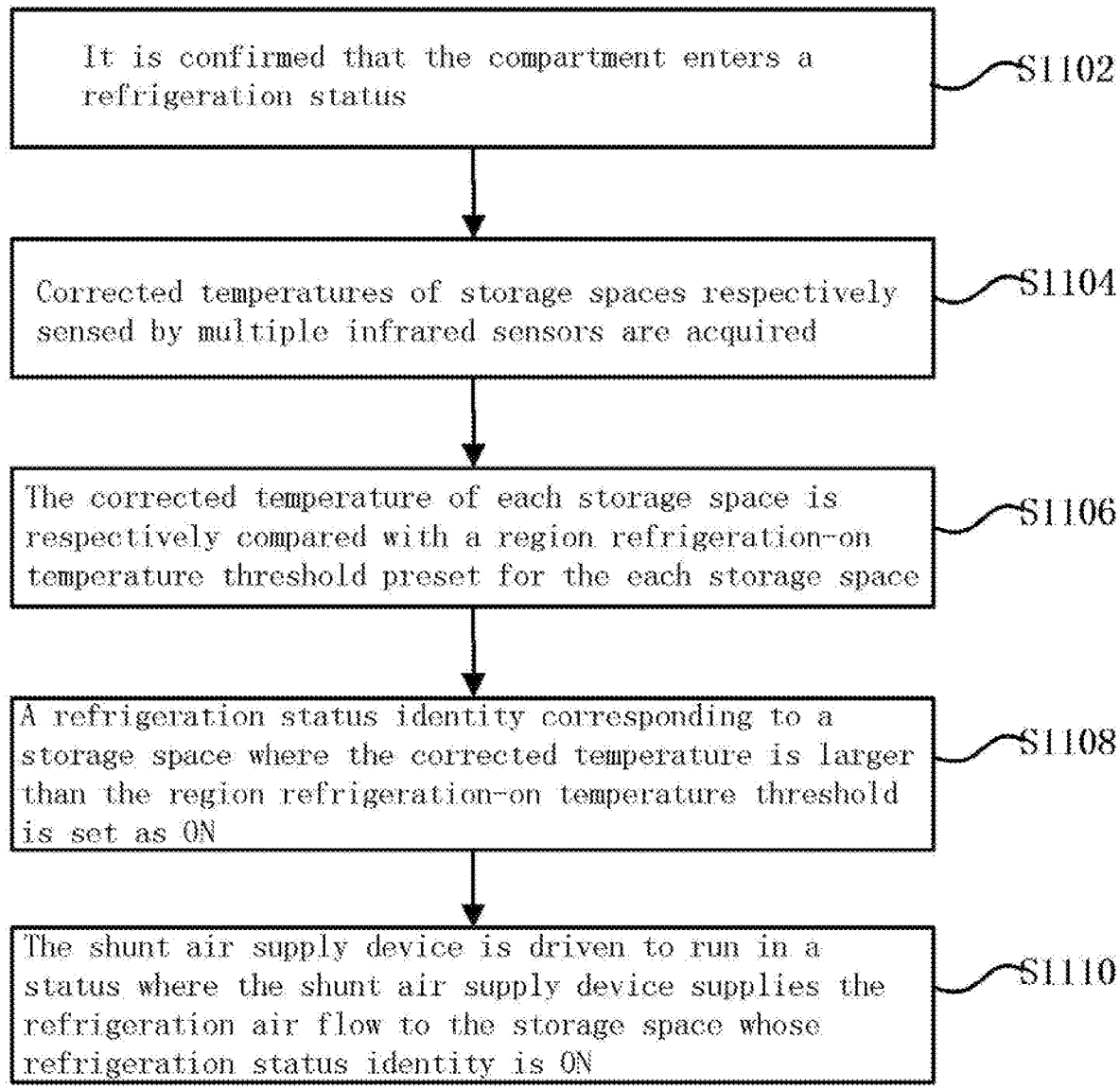
FIG. 11 is a flowchart illustrating a region-division refrigeration of a compartment implemented by a refrigerator in accordance with an embodiment of this invention.

FIG. 11 is a flowchart illustrating a region-division refrigeration of a compartment implemented by a refrigerator in accordance with an embodiment of this invention. When the region-division refrigeration of the compartment is implemented, the following steps may be performed.

At step S1102, it is confirmed that the compartment enters a refrigeration status.

At step S1104, corrected temperatures of storage spaces respectively sensed by multiple infrared sensors are acquired. The corrected temperature directly reflects a temperature of a stored article in a storage space.

At step S1106, the corrected temperature of each storage space is respectively compared with a region refrigeration-on temperature threshold preset for the each storage space.

At step S1108, a refrigeration status identity corresponding to a storage space where the corrected temperature is larger than the region refrigeration-on temperature threshold is set as ON.

At step S1110, the shunt air supply device is driven to run in a status where the shunt air supply device supplies the refrigeration air flow to the storage space whose refrigeration status identity is ON.

Confirming that the refrigeration compartment enters the refrigeration status in the step S1102 further comprises: acquiring an environment average temperature in the compartment (for example, the temperature measured by NTC is used); determining whether the environment average temperature in the compartment is larger than or equal to a preset overall refrigeration-on temperature threshold; if yes, opening a refrigerating air door arranged between a cold source and a shunt air supply device so as to allow the compartment to enter the refrigeration status.

If the environment average temperature in the compartment is smaller than the preset overall refrigeration-on temperature threshold, it is determined whether the refrigerating air door is in an opened status. If yes, it is determined whether the environment average temperature in the compartment and/or the corrected temperature of each storage space satisfy a preset refrigeration compartment refrigeration stopping condition. If the compartment refrigeration stopping condition is satisfied, the refrigerating air door is closed.

The foregoing compartment refrigeration stopping condition may include: either of the corrected temperature of each storage space is smaller than a refrigeration-off temperature threshold preset for the ach storage space, wherein a region refrigeration-off temperature threshold of each storage space is smaller than the region refrigeration-on temperature threshold, or the environment average temperature in the compartment is smaller than a preset overall refrigeration-off temperature threshold.

Another optional compartment refrigeration stopping condition includes: in a case where the environment average temperature in the compartment is smaller than the preset overall refrigeration-off temperature threshold, either of the corrected temperature of each storage space is smaller than the region refrigeration-on temperature threshold preset for each storage space, wherein the region refrigeration-off temperature threshold of each storage space is smaller than the region refrigeration-on temperature threshold, or a difference extracted between the overall refrigeration-off temperature threshold and the environment average temperature in the compartment is larger than a preset margin value.

After the step S1106, it may also compare the corrected temperature of each storage space with the region refrigeration-off temperature threshold for the each storage space. The region refrigeration-off temperature threshold of each storage space is smaller than the region refrigeration-on temperature threshold, and a refrigeration status identity corresponding to a storage space where the corrected temperature is smaller than the region refrigeration-off temperature threshold is set as OFF By performing the flow of the foregoing steps S1102 to S1110 and implementing the refrigeration control with the corrected temperature acquired through a temperature measurement error correcting method of an infrared sensor according to this embodiment, the accuracy of the temperature measurement can be improved, the refrigeration control can be implemented timely and effectively, the influence of the article with a high temperature on the surrounding storage space can be reduced, the storage effect of the refrigeration compartment in the refrigerator can be improved, the nutrient loss of the food can be reduced and the waste of electrical power due to refrigeration on the overall compartment can be avoided.

So far, those skilled in the art should be aware that, although a variety of exemplary embodiments of the present invention are shown and described in detail, a number of other variants or modifications obeying the principles of the present invention can still be directly determined or derived according to the contents disclosed in the present invention as long as the other variants or modifications do not break away from the spirit and scope of the present invention. Thus, the scope of the present invention should be understood and identified as covering all of these and other variants or modifications.

What is claimed is:

1. A temperature measurement error correcting method of an infrared sensor of a refrigerator, comprising:
    confirming that the infrared sensor is running in an operation status of the refrigerator;
    acquiring a measured value in the operation status by sensing a temperature of a preset region via the infrared sensor;
    acquiring a correction constant corresponding to the infrared sensor, by comparing a measured value sensed by the infrared sensor in a correction status of the refrigerator with a standard temperature, wherein the correction status is making an implementation during a first power test after assembly of the refrigerator, and in the correction status, ensuring a door body of the refrigerator is closed and all components in a refrigeration system thereof are disabled; and
    correcting the measured value in the operation status with the correction constant so as to acquire a corrected temperature.

2. The method of claim 1, wherein acquiring the correction constant by comparison comprises:
    acquiring a trigger signal for entering the correction status, and disabling at least one component which affects the temperature of the preset region so as to enter the correction status;
    respectively acquiring the measured value sensed by the infrared sensor in the correction status and the standard temperature measured by a standard temperature measuring device arranged in the preset region;
    calculating a difference between the measured value in the correction status and the standard temperature; and
    taking the difference as the correction constant.

3. The method of claim 2, wherein acquiring the measured value sensed by the infrared sensor in the correction status comprises:
    collecting a sensing result of the infrared sensor in the correction status once every first predetermined time so as to acquire a correction sampling value;
    successively acquiring a first predetermined number of the correction sampling values and removing a maximum correction sampling value and a minimum correction sampling value from the acquired correction sampling values; and
    calculating an average value of the remaining correction sampling values after removing the maximum correction sampling value and the minimum correction sampling value, as the measured value sensed by the infrared sensor in the correction status.

4. The method of claim 3, after acquiring the correction sampling values, further comprising:
    determining whether the correction sampling values are within a preset normal value interval;
    if yes, sequentially storing the correction sampling values in a preset correction sampling value queue according to sampling time, wherein a length of the correction sampling value queue is equal to the first predetermined number; and
    if not, setting the correction sampling values as invalid data and removing the same, and outputting a prompt signal indicating abnormality of correction measurement when all the successive first predetermined number of temperature sampling values are invalid data.

5. The method of claim 2, wherein acquiring the standard temperature comprises:
- collecting a sensing result of the standard temperature measuring device once every second predetermined time so as to acquire a standard sampling value;
- successively acquiring a second predetermined number of the standard sampling values and removing a maximum standard sampling value and a minimum standard sampling value from the acquired standard sampling values; and
- calculating an average value of the remaining standard sampling values after removing the maximum standard sampling value and the minimum standard sampling value, as the standard temperature.

6. The method of claim 5, after acquiring the standard sampling values, further comprising:
- determining whether the standard sampling values are within a preset normal value interval;
- if yes, sequentially storing the standard sampling values in a preset standard sampling value queue according to sampling time, wherein a length of the standard sampling value queue is equal to the second predetermined number; and
- if not, setting the standard sampling values as invalid data and removing the same, and outputting a prompt signal indicating abnormality of standard measurement when all the successive second predetermined number of standard sampling values are invalid data.

* * * * *